United States Patent
Hagan

(10) Patent No.: US 7,019,517 B2
(45) Date of Patent: Mar. 28, 2006

(54) OFFSET MAGNET ROTARY POSITION SENSOR

(75) Inventor: Allen E. Hagan, Sarasota, FL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/895,760

(22) Filed: Jul. 20, 2004

(65) Prior Publication Data

US 2006/0017430 A1    Jan. 26, 2006

(51) Int. Cl.
    *G01B 7/30*    (2006.01)
(52) U.S. Cl. .............................. 324/207.25; 324/207.2; 324/251
(58) Field of Classification Search ........... 324/207.13, 324/207.2, 207.25, 174, 251; 123/612, 617, 123/406.58
    See application file for complete search history.

(56) References Cited

U.S. PATENT DOCUMENTS

| | | | |
|---|---|---|---|
| 4,125,821 A | 11/1978 | Masuda | |
| 4,719,419 A | 1/1988 | Dawley | |
| 5,159,268 A | 10/1992 | Wu | 324/207.2 |
| 5,236,518 A | 8/1993 | Shirai et al. | 148/122 |
| 5,523,679 A | 6/1996 | Kalb | |
| 5,818,223 A | 10/1998 | Wolf | 324/207.12 |
| 6,326,781 B1* | 12/2001 | Kunde et al. | 324/207.21 |
| 6,448,761 B1 | 9/2002 | Stumpe et al. | |
| 6,491,019 B1* | 12/2002 | Apel | 123/337 |
| 6,492,697 B1 | 12/2002 | Plagens et al. | 257/426 |
| 6,707,293 B1 | 3/2004 | Wan et al. | 324/207.25 |
| 6,747,448 B1 | 6/2004 | Berndt | 324/207.15 |
| 2003/0182809 A1 | 10/2003 | Enzinna | 33/1 PT |
| 2004/0007067 A1* | 1/2004 | Meyer et al. | 73/514.31 |
| 2004/0085062 A1* | 5/2004 | Miyata et al. | 324/207.2 |
| 2004/0095131 A1 | 5/2004 | Withanawasam et al. | 324/207.21 |
| 2004/0100252 A1 | 5/2004 | Babin | 324/207.25 |
| 2005/0022785 A1* | 2/2005 | Kurita et al. | 123/399 |

FOREIGN PATENT DOCUMENTS

EP    1143220 A1    10/2001
WO    WO 02/42713 A2    5/2002

OTHER PUBLICATIONS

PCT- Notification of Transmittal of the International Search Report and The Written Opinion of the International Searching Authority, or the Declaration, Date of Mailing Feb. 12, 2005.

* cited by examiner

*Primary Examiner*—Bot LeDynh
(74) *Attorney, Agent, or Firm*—Kermit D. Lopez; Luis M. Ortiz

(57) ABSTRACT

A rotary position sensing system and method are disclosed, including a shaft comprising an offset mounting hole, and a magnet having a magnetic field that is magnetized across an axis of the magnet, wherein the magnet is mounted to the shaft at the offset mounting hole and oriented to the offset mounting hole. One or more Hall-effect sensing elements can also be located a fixed distance from the magnet to provide a linear output signal proportional to the magnetic field of the magnet and the angular position of the shaft, thereby providing an angular position measurement of a device mated to the shaft.

9 Claims, 6 Drawing Sheets

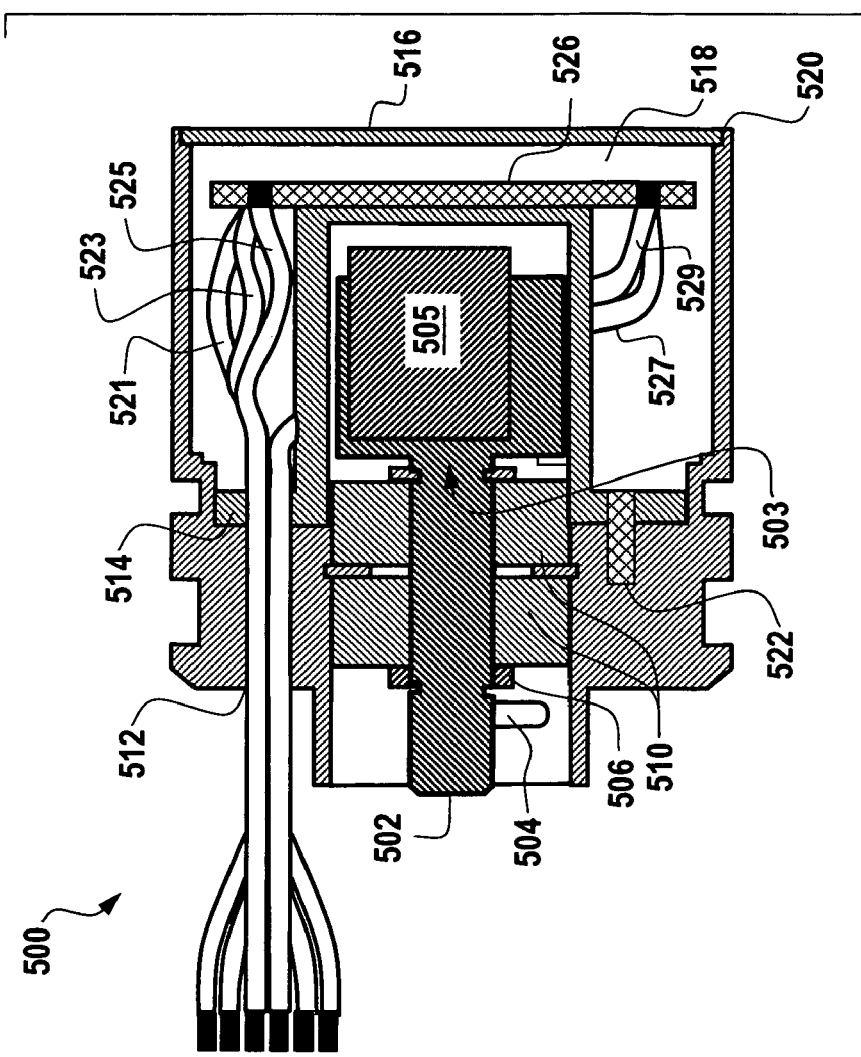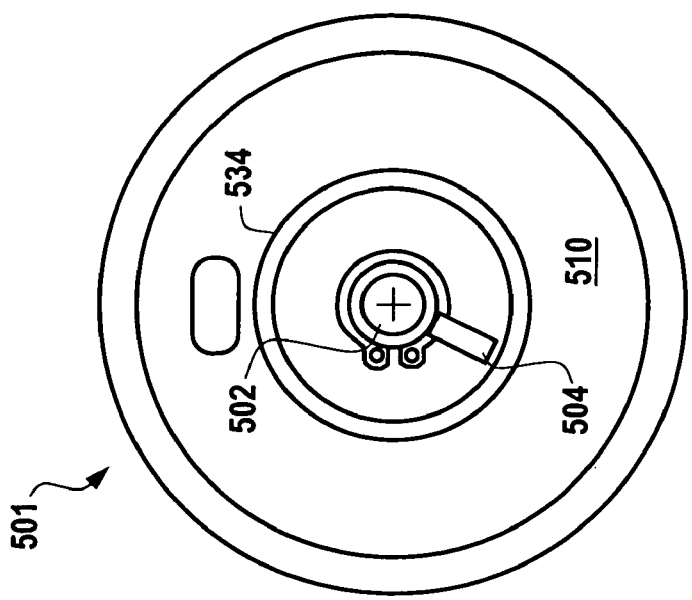
Fig. 5

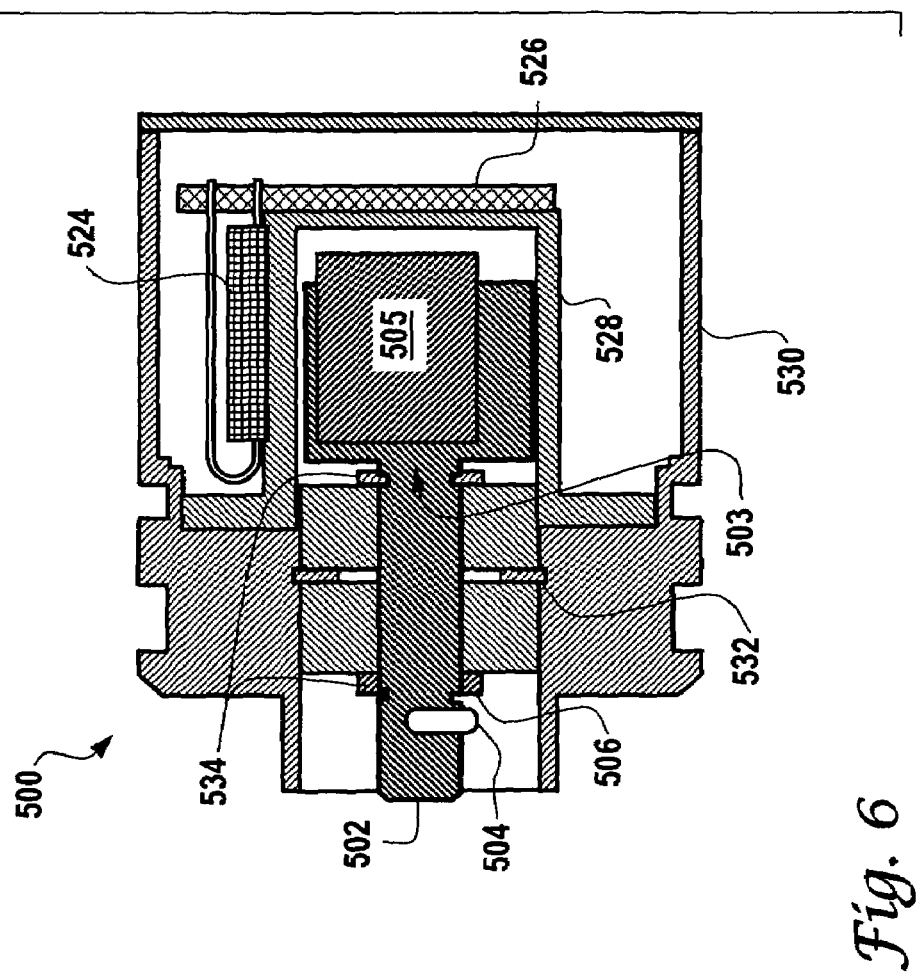
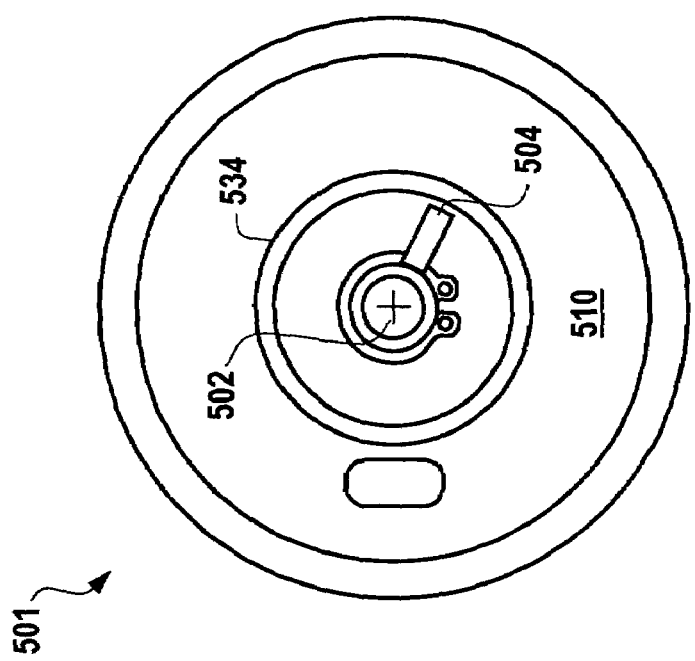
Fig. 6

OFFSET MAGNET ROTARY POSITION SENSOR

TECHNICAL FIELD

Embodiments are generally related to sensor devices, methods and systems. Embodiments are also related to angular position measurement devices and rotary position sensors. Embodiments are additionally related to Hall-effect sensing devices.

BACKGROUND OF THE INVENTION

A variety of techniques are utilized for angular position sensing. Optical, resistive, electrical, and electrostatic and magnetic fields have all been utilized with sensing devices to measure angular position. There are many known devices that utilize optical, resistive, electrical, magnetic and other such energies for sensing. Examples of such sensing devices include resistive contacting sensors, inductively coupled ratio detectors, variable reluctance devices, and capacitively coupled ratio detectors, optical detectors utilizing the Faraday effect, photo-activated ratio detectors, radio wave directional comparators, and electrostatic ratio detectors. In addition, there are many other sensors/detectors that are not mentioned herein.

Each of these detection methods offers much value for one or more applications, but none meet all application requirements for all position sensing applications. The limitations may be due to cost, sensitivity to particular energies and fields, resistance to contamination and environment, stability, ruggedness, linearity, precision, or other similar factors. Transportation applications generally, and specifically automotive applications, are very demanding.

In mechanical and/or electromechanical systems, such as for example, automotive applications, motion can be initiated and controlled by rotating a member such as a shaft (e.g., camshaft, crankshaft, and so forth). The angular motion of the shaft is then translated into some other motion, such as linear displacement, rotation of a pump or fan, or the angular rotation of some other intermediate part at a different angular velocity or spatial orientation. Numerous mechanical means such as gears, cams, pulleys, and belts are commonly employed in translating the angular motion of an input shaft to drive an output device. Camshaft and crankshaft mechanisms, for example, are well known in the mechanical transportation arts. Thus, a need exists for sensors that can properly monitor motion and position in such mechanical systems.

In engine cam and crank applications, for example, recently manufactured cars require precision rotary sensors for high performance and fuel economy. In particular, some of the new camless engines require precision rotary sensors. Such engines utilize electrical-mechanical solenoids to control the engine valves. The opening and closing of such valves are not controlled by a fixed cam but can be controlled by a microprocessor that receive inputs from precision rotary sensors regarding the crank, speed, torque, load, exhaust gas mixture, oxygen content, and so forth. In this manner, an engine can be achieved that is both efficient and high performing.

Thus, a critical need exists for high performance camshaft and crankshaft position sensors. Major automakers worldwide are presently working, for example, on camless four-stroke engines because of potential performance advantages and reduction in mechanical components subject to wear. A number of development hurdles must be overcome before such mechanical systems can be widely deployed. Cost will limit the camless engine to high-performance cars for some time. Obviously, camless engines do not require a camshaft sensor. On the other hand, valve position sensors will very likely be needed. Developers are presently faced with the challenge of creating cost-effective solutions now, in anticipation of this emerging need. As transport systems develop in their complexity and performance, a need has emerged for non-contact rotary position sensors, which offer significant durability enhancements, lower cost, and improved performance.

Rotary position sensors play a particularly critical role in crankshaft applications used in automotive and other transport systems (e.g., trucking, aerospace, etc.), because the U.S. government requires misfire detection as part of the On-Board Diagnostics incorporated in the engine control system to detect failures of any components of the system. Such failures could result in emissions not being controlled within the proper limits. The misfire event must be identified down to a specific cylinder except at low loads and high rpm.

A "misfire" is generally known as an absence of combustion in one or more cylinders, either occurring singly or multiple times. It can be caused by a failure of the ignition system to provide spark or by a failure in the fuel injection system resulting in fuel not being provided to a cylinder. It differs from "knock", which is spontaneous ignition of the fuel-air mixture. Knock can result in engine damage and is a function of several parameters of both the engine and the fuel used. Engines expected to operate on a variety of fuels usually incorporate a knock detection and prevention function in the engine control system. Misfires typically do not result in engine damage but may cause failure of the catalytic converter if it has to cope with unburned gases.

For a constant load torque, the crankshaft accelerates each time a combustion event occurs, followed by a deceleration due to the load torque. By measuring these speed fluctuations, misfires can be detected since a larger deceleration will occur if one or more firing pulses are missed. For a fixed engine displacement, each power pulse becomes smaller as the number of cylinders increases, reducing the magnitude of the speed fluctuations. Likewise, as the load on the engine decreases, the engine decelerates less between power pulses. A variation in load torque due to a bump in the road may also result in a crankshaft speed fluctuation and possibly be confused with a misfire. The misfire detection algorithm is disabled when load torque fluctuations occur, either by an accelerometer signal or by monitoring wheel speed fluctuations. The crankshaft speed fluctuation method is the most widely used approach since most engines already incorporate a crankshaft position sensor.

The relationship between the angular position of a rotating input shaft and the position of an output or intermediate mechanical member is ubiquitous throughout the mechanical arts. In some applications, such as servomotors, a position sensor is mounted directly to the output shaft of a motor, and the output position and/or speed of the machine can be readily determined by monitoring the rotation of the motor. In any mechanical system wherein the output position of a mechanical part is to be determined by the position of a rotating input shaft, a key element is the rotary position sensor.

A rotary position sensor must accurately and reliably determine the angular position of the input shaft before that information can be extrapolated into the position of the output member. In addition to accuracy and reliability issues, each specific application will provide its own demands and limitations on the design of the rotary position sensor.

In some systems it may only be necessary to sense rotation over a single turn. In still other applications, physical constraints may make it difficult to couple electrical signals to the rotating portion of the sensor. And finally, the cost of various position sensors may be an overriding factor in determining the best sensor for a particular application.

Some rotary position sensors currently in use include rotary potentiometers, inductive position resolvers, and optical encoders. Each device has characteristic advantages and disadvantages, which make some devices more suitable for particular applications than for others. Rotary potentiometers, for example, supply a voltage signal proportional to the position of a wiper contact, which rides along a resistive element. Initially, such rotary potentiometers are quite accurate and provide excellent position indication over a single turn of the input shaft. Over time, however, the sliding motion of the wiper contact over the resistive element can lead to wear which alters the resistance ratio between the resistive element and the wiper contact, leading to inaccuracy in the output position signal.

Rotary potentiometers are also subject to contamination of the contact elements, which can adversely affect the accuracy of the device. For these reasons, rotary potentiometers are not well suited for those applications where extended long-term reliability is required or where harsh environmental conditions are likely to adversely affect the sensor. Thus, a rotary potentiometer would be particularly unsuited for application in the crankshaft and camshaft mechanisms described above.

Inductive position resolvers, on the other hand, have advantages over rotary potentiometers in that they are non-contact devices. Resolvers operate on inductive principles, having mutually coupled coils mounted to both a rotor and a stator. As the rotor coil rotates relative to the stator coil, the mutual inductance between the two coils changes such that a voltage signal impressed on the stator coil will be coupled to the rotor coil in varying strength depending on the angular relationship between the coils. While resolvers have obvious advantages over rotary potentiometers, a drawback is that they require signal connections to the rotating member. Therefore, slip rings or some other mechanism for connecting electrical signals to the rotating member are required. Also, resolvers are generally more expensive than rotary potentiometers and more sensitive to vibration and shock.

Finally, optical encoders are often used as rotary position sensors, but such devices also offer significant drawbacks for certain applications. As with resolvers, optical encoders tend to be expensive, thus making them inappropriate for those applications where low cost is a critical design factor. Furthermore, encoders are digital devices, emitting light pulses for each fraction of a rotation of the input shaft. The resolution of an encoder is determined by physical limitations in the number of pulses, which can be generated per revolution of the input shaft. Thus, optical encoders are inappropriate for applications where a continuous analog signal is required. In particular, such devices are not well suited for camshaft and crankshaft mechanisms.

It can thus be appreciated based on the foregoing that in many automotive and transportation applications, low-cost, durable, and efficient rotary position sensors are required. It is believed that conventional rotary position sensing devices and systems, while adequate for low-performance applications, are not reliable for high-performance and constantly evolving mechanical and electromechanical applications such as automotive and aerospace applications. A solution to such inadequacies is therefore disclosed herein.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide for improved sensor devices, methods and systems.

It is another aspect of the present invention to provide for improved angular position measurement devices.

It is yet another aspect of the present invention to provide for an improved rotary position sensing system and method.

It is still a further aspect of the present invention to provide for a rotary position sensor that incorporates Hall-effect sensing elements and an offset magnet.

It is also an aspect of the present invention to provide for rotary position sensor methods and systems that improves reliability and provides independent dual or single output, non-contact sensor configurations.

The aforementioned aspects of the invention and other objectives and advantages can now be achieved as described herein. A rotary position sensing system and method are disclosed herein that includes a shaft comprising an offset mounting hole, and a magnet having a magnetic field that is magnetized across an axis of the magnet, wherein the magnet is mounted to the shaft at the offset mounting hole and oriented to the offset mounting hole. One or more Hall-effect sensing elements can also be located a fixed distance from the magnet to provide a linear output signal proportional to the magnetic field of the magnet and the angular position of the shaft, thereby providing an angular position measurement of a device mated to the shaft.

A housing or shell can also be provided for containing the shaft, the magnet and the Hall-effect sensing element. The housing can be formed from a non-metallic or a metallic (e.g., either a magnetic material and/or a non-magnetic material), depending upon design considerations. The shaft can be mounted to the housing utilizing a plurality of bearings. The magnet itself can be configured to comprise a cylindrical shape. The Hall-effect sensing element(s) can be implemented within the context of a Hall integrated circuit (IC) comprising a chip housing assembly and a printed circuit board (PCB) thereof.

In general, the magnet can be oriented in the mounting hole such that the magnetic field strength is approximately equal to zero when the shaft is rotated such that the position of the magnet is furthest from the Hall-effect sensing element. As the magnet is rotated and moves closer to the Hall-effect sensing element, a change in the magnetic field strength caused by the rotation of the magnet and a change in the magnetic field strength caused by the closer movement of the magnet to the Hall-effect sensing element results in the linear output signal. The linear output signal is proportional to angular position, which can provide an angular position measurement of the device mated to the shaft.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention. All of the accompanying figures utilize the same principle of angular position sensing, but differing in lead wire attachment locations.

FIG. 5 illustrates sectional and projected views of a rotary position sensing system, which can be implemented in accordance with an alternative front cable exit embodiment FIG. 6 illustrates additional sectional and projected views of the rotary position sensing system depicted in FIG. 5, which can be implemented in accordance with an alternative front cable exit embodiment;

DETAILED DESCRIPTION OF THE INVENTION

The particular values and configurations discussed in these non-limiting examples can be varied and are cited merely to illustrate at least one embodiment of the present invention and are not intended to limit the scope of the invention.

Figure 3:
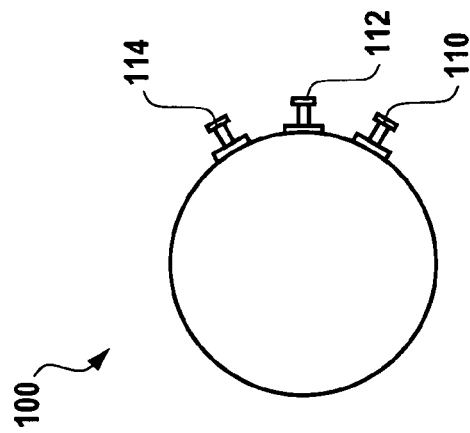
FIG. 3 illustrates a back view of the rotary position sensing system depicted in FIGS. 1–2, in accordance with a preferred embodiment of the present invention.
Figure 2:
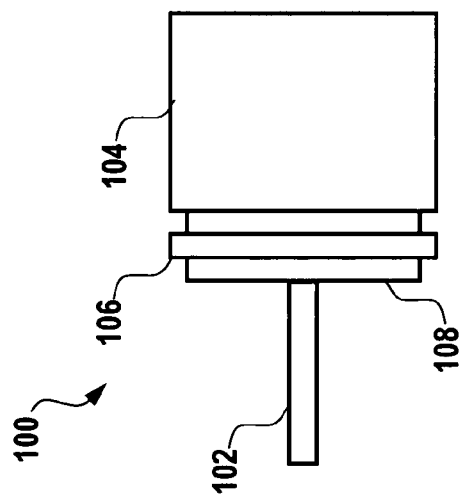
FIG. 2 illustrates a side view of the rotary position sensing system depicted in FIG. 1, in accordance with a preferred embodiment of the present invention.
Figure 1:
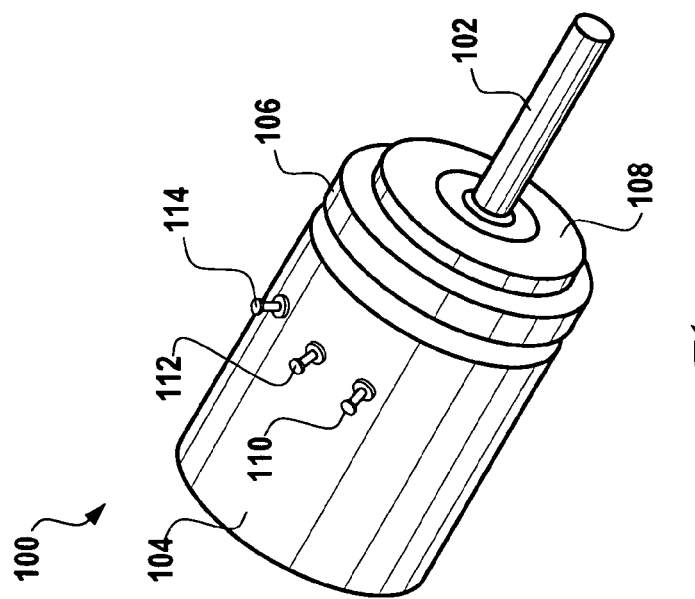
FIG. 1 illustrates a rotary position sensing system with terminals for electrical connections, which can be implemented in accordance with a preferred embodiment of the present invention.
Figure 4:
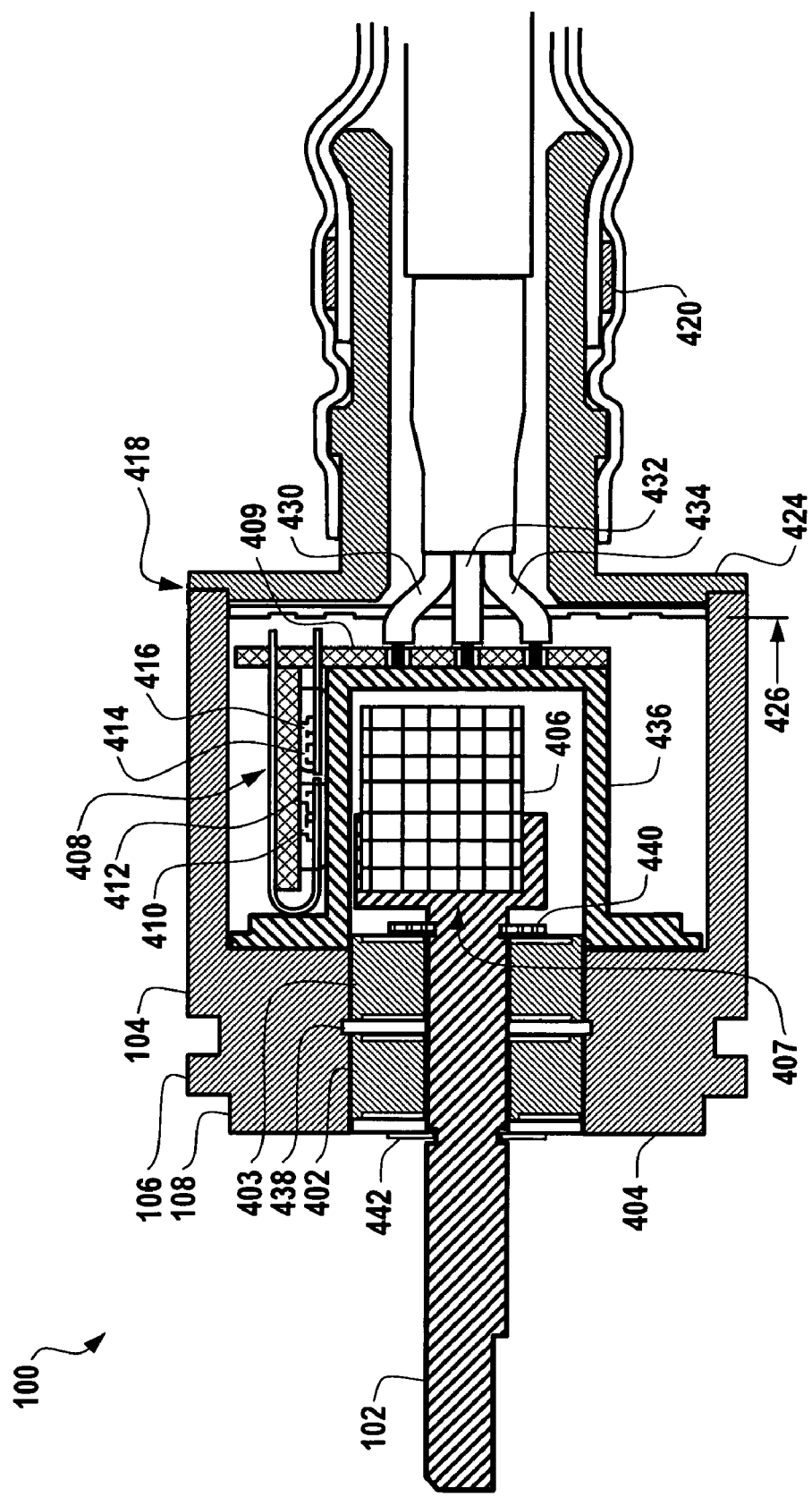
FIG. 4 illustrates a detailed sectional view of the rotary position sensing system in accordance with a preferred rear cable exit embodiment of the present invention.

FIG. 1 illustrates a rotary position sensing system 100, which can be implemented in accordance with a preferred embodiment of the present invention. FIG. 2 illustrates a side view of the rotary position sensing system 100 depicted in FIG. 1, in accordance with a preferred embodiment of the present invention. FIG. 3 illustrates a back view of the rotary position sensing system 100 depicted in FIGS. 1–2, in accordance with a preferred embodiment of the present invention.

Note that in FIGS. 1–4, identical or similar parts or elements are generally indicated by identical reference numerals. System 100 can be implemented as a rotary position sensor, which includes a shaft 102 and housing portions 104, 106, and 108. Additionally, a plurality of electrical contacts 110, 112 and 114 can be provided, which protrude through housing portion 104. Housing portions 104, 106, and 108 generally form a shell or housing 404, which maintains and/or contains shaft 102 and an offset magnet 406. Housing 404 can be implemented from a material such as, for example, steel. By offsetting magnet 406 from the rotational axis of shaft 102, the magnetic field strength of the magnet 406 is essentially linear.

One or more Hall-effect sensing elements 410 and 416 can provide an output signal that is proportional to the magnetic field of magnet 406. The shaft 102 can be configured to include an offset mounting hole 407 for mounting magnet 406. In general, magnet 406 can be configured as a cylindrically shaped magnet, which is magnetized across the axis and oriented relative to the offset direction.

Hall-effect sensing elements 410 and 416 generally rely on a reaction between a current flowing between a first set of contacts and an orthogonally-applied magnetic field to generate a voltage across a second set of contacts. With no magnetic field applied to the Hall-effect sensing element 410 and 416, no voltage should be generated across the second set of contacts. In practice, a voltage is typically generated across the second set of contacts even with no magnetic field applied to the Hall-effect sensing element (s). This voltage is referred to as null offset. An example of a Hall-effect sensing element, which may be adapted for use with an embodiment of the present invention is disclosed in U.S. Pat. No. 6,492,697, entitled "Hall-effect element with integrated offset control and method for operating hall-effect element to reduce null offset," which issued to Plagens et al on Dec. 10, 2002, and is assigned to Honeywell International, Inc. U.S. Pat. No. 6,492,697 is incorporated herein by reference.

Magnet 406 is oriented with the null field thereof aligned with the offset direction. Hall-effect sensing elements 410 and 416 can be located at a fixed distance from magnet 406 to provide output. Shaft 102 can be mounted utilizing one or more bearings, such as, for example, bearings 402 and 403. The shell or housing 404 can be formed from a non-metallic material, or a metallic (magnetic or a non-magnetic) material. Shaft 102 can then mate to a device (not shown in FIGS. 1–4) requiring angular position measurement.

System 100 can further be implemented with a PCB (Printed Circuit Board) and IC (Integrated Circuit) housing assembly 408, which surround and protect Hall-effect sensing elements 410 and 416. Housing 406 can be configured with a weld 418, which connects housing 406 to a termination or end-cap piece 424. A plurality of wire leads 420, 432, and 434 are contained within housing 406 and attach to a PCB portion 409, which is further attached to the PCB (Printed Circuit Board) and IC (Integrated Circuit) housing assembly 408. A retaining ring 440 generally surrounds and protects shaft 102, along with a retaining ring 438 and another retaining ring 442. An IC chip housing 436 additionally surrounds magnet 406 and can form part of the PCB (Printed Circuit Board) and IC (Integrated Circuit) housing assembly 408. A shield braid 420 can further be added to system 100 to protect and surround a portion of the termination or end-cap piece 424. A line 426 depicted in FIG. 4 generally indicates an epoxy potting level.

System 100 is thus based on the concept that if a magnet 406, which is magnetized across the axis thereof, is rotated on the axis, a Hall chip (e.g., Hall-effect sensing elements 401 and 416) located at a fixed or pre-determined distance from magnet 406 will generate a "sine" wave output, which follows the magnetic field output of magnet 406. For very small angles (e.g., approximately 20 degrees), the output may be close to linear in some sections. As the magnet is offset, the "sine" wave is altered by elongating and straightening in one section of the output signal thereof and shrinking in another. The elongated section of the output signal therefore can generate a linear output relative to angular position.

FIG. 5 illustrates a section view of a rotary position sensing system 500, which can be implemented in accordance with an alternative embodiment of the present invention. FIG. 6 illustrates a projected view of the rotary position sensing system 500 depicted in FIG. 5. Projected top views 501 are also depicted in FIGS. 5 and 6. Additionally, although an alternative embodiment is depicted in FIGS. 5–6, it can be appreciated that system 500 is analogous to system 100 of FIGS. 1–4. Thus, the features or elements depicted in system 500 can be adapted for utilization with the features or elements of system 100, and vice versa. Thus, FIGS. 5–6 are projected views of each other. FIG. 5 illustrates the wire exit, while FIG. 6 illustrates the Hall chips, with essentially one element per Hall chip. Because the Hall chips are programmable, the output is adjustable anywhere in the range of the Hall chip input voltage. In accordance with one potential embodiment, the output may be, for example, −5 V to +5 V.

Rotary position sensing system 500 depicted in FIGS. 5–6 generally includes a shaft 502 comprising an offset mounting hole 502, and a magnet 505 having a magnetic field that is magnetized across an axis of the magnet 505, such that the magnet 505 is mounted to the shaft 502 at the offset mounting hole 503 and oriented to the offset mounting hole. One or more Hall-effect sensing elements (shown in FIG. 6) can also be located a fixed distance from the magnet 505 to provide a linear output signal proportional to the magnetic field of the magnet 505 and the angular position of the shaft 502, thereby providing an angular position measurement of a device (not shown in FIGS. 5–6), which may be mated to the shaft 502.

A shell or housing 530 can also be provided for containing the shaft 502, the magnet 505 and the Hall-effect sensing elements. The housing 530 is generally analogous to housing 404 of FIGS. 1–4 and can be formed from a non-metallic material, a metallic (magnetic material or non-magnetic) material, depending upon design considerations. The shaft 502 can be mounted to the housing 530 utilizing a plurality of bearings 510. The magnet 505 can be configured to comprise a cylindrical shape.

The Hall-effect sensing element(s) can be implemented within the context of a Hall integrated circuit (IC) comprising a chip housing assembly 528 and a printed circuit board (PCB) 526 thereof. A linkage pin 504 can be connected to shaft 502, such that the shaft 502 is retained by retaining rings 534, 532 and one or more washers 506. A cover 516 can be connected to housing 530 via a tack or TIG weld 520. A region 518 can be implemented with a potting level, wherein the pot is located above the PCB components (e.g., PCB 526) and below cover 516. System 500 can also be configured to include a seal lead wire exit 512 and a loctite material 514. A spring pin 522 can protrude at chip housing 528. A plurality of lead wires 521, 523, 525, 527 and 429 can also be connected to PCB 526.

In general, the magnet 505 possesses a magnetic field strength approximately equal to zero when the magnet is rotated from the Hall-effect sensing element at a position of the magnet 505 that is furthest from the Hall-effect sensing element. As the magnet 505 is rotated and moves closer to the Hall-effect sensing element, a change in the magnetic field strength caused by the rotation of the magnet 505 and a change in the magnetic field strength caused by the closer movement of the magnet 505 to the Hall-effect sensing element results in a linear output signal. The linear output signal is proportional to angular position, which can provide an angular position measurement of a device mated to the shaft 502.

Figure 7:
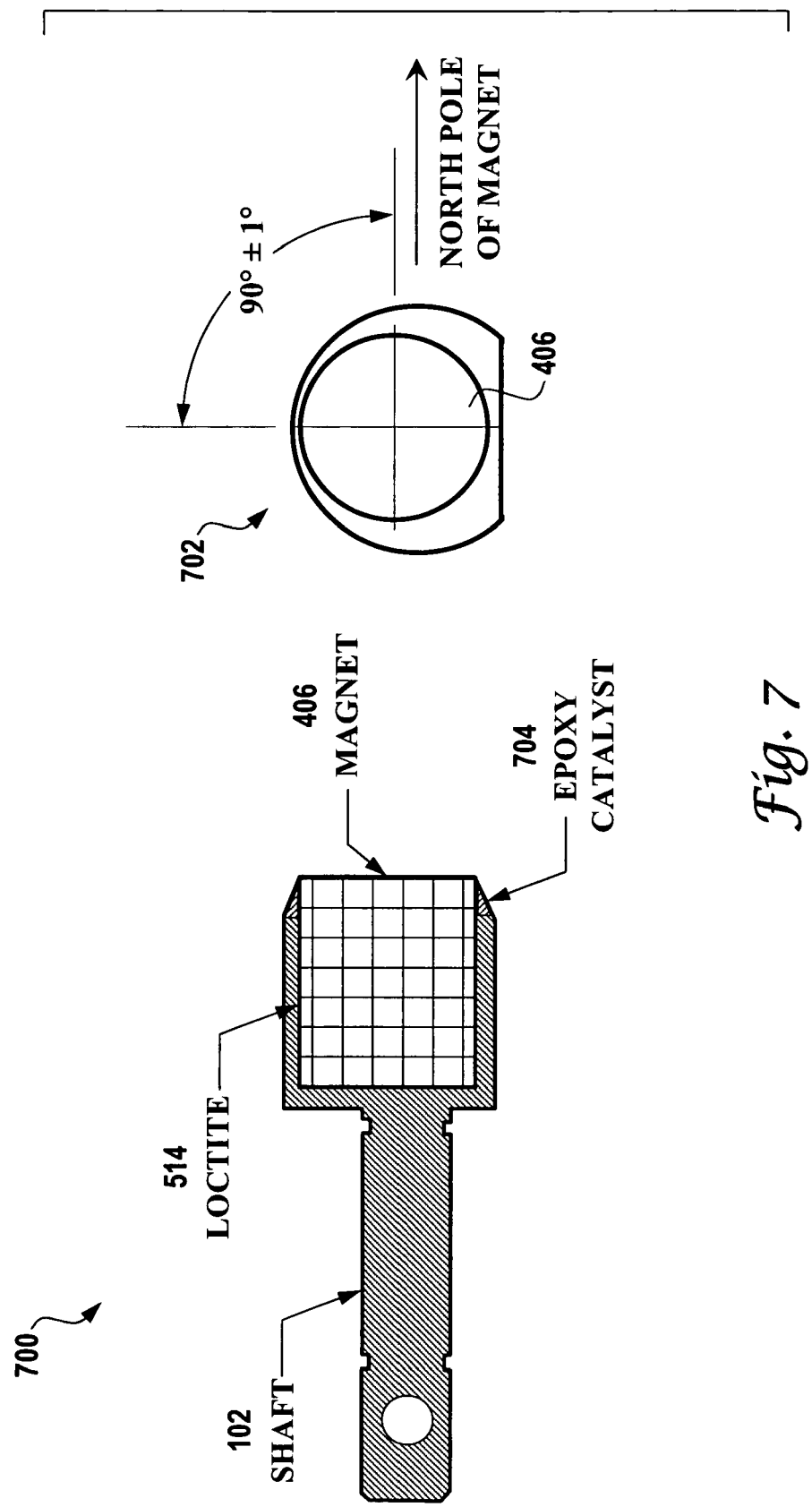
FIG. 7 illustrates sectional projected views of a rotary position sensing system, including a shaft, magnet, loctite material, and an epoxy/catalyst, in accordance with a preferred embodiment of the present invention.

FIG. 7 illustrates sectional projected views of a rotary position sensing system 700, including a shaft 102, magnet 406, loctite material 514, and an epoxy/catalyst 704. The projected view 702 of the rotary position sensing system 700 includes a view of the north pole of the magnet. System 700 is analogous to systems 100 and 500 depicted herein. It is important to note that although varying embodiments are illustrated in FIGS. 1–7, all of the configurations illustrated in FIGS. 1–7 represent the same concept except for differentiations with respect to electrical connections thereof. Also, in FIGS. 1–7, identical or similar elements or features are generally indicated by identical reference numerals. Thus, shaft 102 of FIGS. 1–7 includes an offset mounting hole.

System 700 includes magnet 406 having a field that is magnetized across the axis of magnet 406, wherein magnet 406 is mounted to shaft 102 at the offset mounting hole and oriented to the offset mounting hole. Additionally, at least one Hall-effect sensing element (i.e., one or more Hall-effect sensing elements), such as a Hall chip, can be located at a fixed distance from magnet 406 to provide a linear output signal proportional to the magnetic field of magnet 406 and the angular position of shaft 102, thereby providing an angular position measurement of a device, which may be mated to shaft 102.

Figure 8:
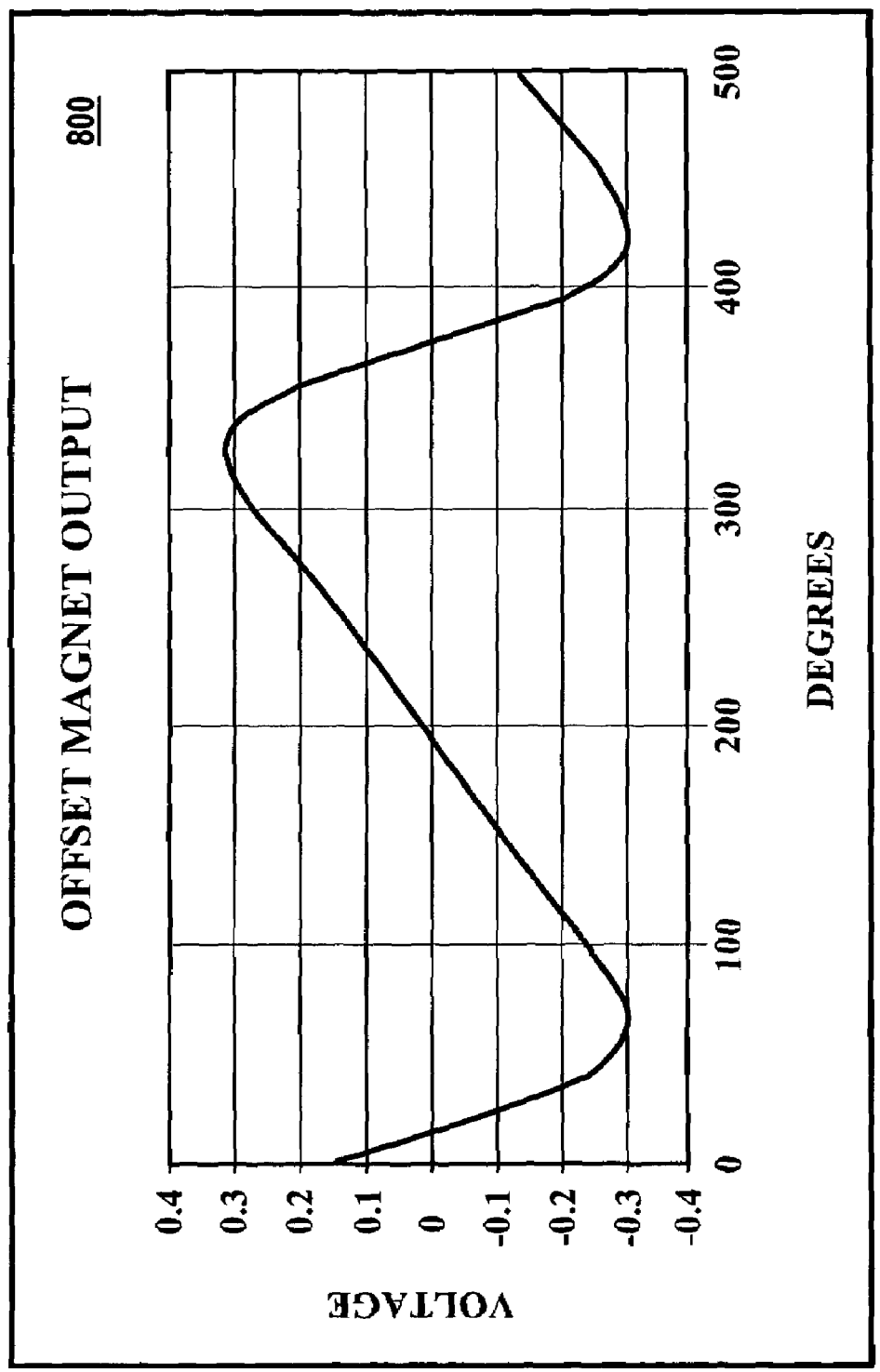
FIG. 8 illustrates a graph of data, which can be generated by the offset magnet depicted in FIGS. 1–7, in accordance with one preferred or alternative embodiments.

FIG. 8 illustrates a graph 800 of data, which can be generated by the offset magnet depicted in FIGS. 1–7, in accordance with preferred or alternative embodiments. Graph 800 depicts a voltage range of −0.4 V to +0.4 V versus degrees. It can be appreciated, of course, that other voltage ranges are possible, such as, for example, −5 V to +5V. The particular voltage range of −0.4 V to +0.4 V depicted in graph 800 is presented for illustrative purposes only and is not considered a limiting feature of the invention. Because the Hall-effect sensing elements (e.g., Hall chips) described herein are programmable, the output is adjustable anywhere in the range of the Hall chip input voltage. Such a feature permits the use of dual Hall chips to track closely and provide independent output.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

What is claimed is:

1. A rotary position sensing system, comprising:
   a shaft comprising an offset mounting hole;
   a magnet having a magnetic field that is magnetized across an axis of said magnet, wherein said magnet is and is mounted to said shaft at said off-set mounting hole and oriented to said offset mounting hole;
   at least one Hall-effect sensing element located at a fixed distance from said magnet to provide a linear output signal proportional to said magnetic field of said magnet and said angular position of said shaft, thereby providing an angular position measurement of a device mated to said shaft;

a housing for containing said shaft, wherein said housing is formed from a non-metallic material and said shafts mounted to said housing utilizing a plurality of bearings; and an Integrated Circuit (IC) chip housing assembly, wherein said housing is operatively connected to a termination or end-cap piece and said magnet is surrounded by said IC chip housing assembly, such that said at least one Hall-effect sensing element is surrounded by a Printed Circuit Board (PCB) and said IC chip housing assembly.

2. A rotary sensing system, comprising:

a shaft comprising an offset mounting hole;

a magnet having a magnetic field that is magnetized across an axis of said magnet, wherein said magnet is and is mounted to said shaft at said offset mounting hole and oriented to said offset mounting hole; and at least one Hall-effect sensing element located at a fixed distance from said magnet to provide a linear output signal proportional to said magnetic field of said magnet and said angular position of said shaft, thereby providing an angular position measurement of a device mated to said shaft;

wherein said magnetic field possesses a magnetic field strength approximately equal to zero when said magnet is rotated from said at least one Hall-effect sensing element at a position of said magnet that is furthest from said at least one Hall-effect sensing element; and wherein as said magnet is rotated and moves closer to said at least one Hall-effect sensing element, a change in said magnetic field strength caused by a rotation of said magnet and a change in said magnetic field strength caused by a closer movement of said magnet to said at least one Hall-effect sensing element results in said linear output signal.

3. A rotary position sensing system, comprising:

a shaft comprising an offset mounting hole;

a magnet having a cylindrical shape a magnetic field thereof that is magnetized across an axis of said magnet, wherein said magnet is mounted to said shaft at said offset mounting hole and oriented to said offset mounting hole;

at least one Hall-effect sensing element located at a fixed distance from said magnet;

a housing for containing said shaft, said magnet and said at least one Hall-effect sensing element;

a plurality of bearings for mounting said shaft to said housing, wherein said at least one Hall-effect sensing element provides a linear output signal proportional to said magnetic field of said magnet and said angular position of said shaft, thereby providing an angular position measurement of a device mated to said shaft;

wherein said magnetic field possesses a magnetic field strength approximately equal to zero when said magnet is rotated from said at least one Hall-effect sensing element at a position of said magnet that is furthest from said at least one Hall-effect sensing element; and wherein as said magnet is rotated and moves closer to said at least one Hall-effect sensing element, a change in said magnetic field strength caused by a rotation of said magnet and a change in said magnetic field strength caused by a closer movement of said magnet to said at least one Hall-effect sensing element results in said linear output signal.

4. A rotary position sensing method, comprising the steps of:

configuring a shaft to comprise an offset mounting hole;

providing a magnet possessing a magnetic field that is magnetized across an axis of said magnet;

mounting said magnet to said shaft at said offset mounting hole and oriented offset from said offset mounting hole;

locating at least one Hall-effect sensing element at a fixed distance from said magnet, wherein said at least one Hall-effect sensing element provides a linear output signal that is proportional to said magnetic field of said magnet and said angular position of said shaft, thereby providing an angular position measurement of a device mated to said shaft;

rotating said magnet from said at least one Hall-effect sensing element at a position of said magnet that is furthest from said at least one Hall-effect sensing element, such that said magnetic field possesses a magnetic field strength approximately equal to zero; and rotating and moving said magnet closer to said at least one Hall-effect sensing element to induce a change in said magnetic field strength to generate said linear output signal.

5. The method of claim 4 further comprising the step of providing a housing for containing said shaft, said magnet and said at least one Hall-effect sensing element.

6. The method of claim 5 further comprising the step of mounting said shaft to said housing utilizing a plurality of bearings.

7. The method of 4 further comprising the step of configuring said magnet to comprise a cylindrical shape.

8. The method of claim 4 wherein said at least one Hall-effect sensing element comprises a Hall integrated circuit (IC) comprising a chip housing assembly and a printed circuit board (PCB) thereof.

9. The method of claim 5 further comprising the step of:

forming said housing from at least on of the following types of material: a non-metallic material, a magnetic material, or a non-magnetic material.

* * * * *

UNITED STATES PATENT AND TRADEMARK OFFICE
CERTIFICATE OF CORRECTION

PATENT NO. : 7,019,517 B2 Page 1 of 1
APPLICATION NO. : 10/895760
DATED : March 28, 2006
INVENTOR(S) : Allen E. Hagen It is certified that error appears in the above-identified patent and that said Letters Patent is hereby corrected as shown below:

In Claim 1, column 9, line 2, delete "shafts" and add "shaft";
In Claim 2, column 9, line 2, add "is" before the word "mounted";
In Claim 9, column 10, line 50, delete "on" and add "one".

Signed and Sealed this

Fifteenth Day of August, 2006

JON W. DUDAS
*Director of the United States Patent and Trademark Office*